US 7,716,310 B2

(12) United States Patent
Foti

(10) Patent No.: US 7,716,310 B2
(45) Date of Patent: May 11, 2010

(54) METHOD AND INTERNET PROTOCOL TELEVISION (IPTV) CONTENT MANAGER SERVER FOR IPTV SERVICING

(75) Inventor: George Foti, Dollard des Ormeaux (CA)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 131 days.

(21) Appl. No.: 11/963,424

(22) Filed: Dec. 21, 2007

(65) Prior Publication Data
US 2009/0164642 A1  Jun. 25, 2009

(51) Int. Cl.
*G06F 15/16* (2006.01)
(52) U.S. Cl. ...................... 709/220; 725/110
(58) Field of Classification Search ......... 709/200–203, 709/217–227; 725/25–29, 110, 114, 118
See application file for complete search history.

(56) References Cited

U.S. PATENT DOCUMENTS

| | | | |
|---|---|---|---|
| 2004/0184432 A1 | 9/2004 | Gateva et al. | |
| 2008/0084867 A1* | 4/2008 | Foti et al. | 370/352 |
| 2008/0127255 A1* | 5/2008 | Ress et al. | 725/38 |
| 2008/0288458 A1* | 11/2008 | Sun et al. | 707/3 |
| 2009/0013174 A1* | 1/2009 | Foti et al. | 713/151 |
| 2009/0100147 A1* | 4/2009 | Igarashi | 709/218 |
| 2009/0100181 A1* | 4/2009 | Bengtsson | 709/229 |
| 2009/0119699 A1* | 5/2009 | Crassous et al. | 725/25 |
| 2009/0132717 A1* | 5/2009 | Maes | 709/228 |
| 2009/0193469 A1* | 7/2009 | Igarashi | 725/56 |

FOREIGN PATENT DOCUMENTS

WO    2008/078209 A2    7/2008

OTHER PUBLICATIONS

ETSI TS 183 063 V0.06 (Nov. 2007), "Telecommunications and Internet Converged Services and Protocols for Advanced Networking (TISPAN); IMS based IPTV Stage 3 Specification".
Steven Whitehead et al., "An Evaluation of Session Initiation Protocol (SIP) for use in Streaming Media Applications" Individual Internet Draft, Feb. 2006.
H. Schulzrinne et al., "Real Time Streaming Protocol (RTSP)", Network Working Group, RFC 2326, Apr. 1998.
PCT Search Report from corresponding application PCT/IB2008/054591.

\* cited by examiner

*Primary Examiner*—Moustafa M Meky
(74) *Attorney, Agent, or Firm*—Alex Nicolaescu; Ericsson Canada Inc.

(57) ABSTRACT

There is provided a method and an Internet Protocol Television (IPTV) content manager server for IPTV service. The server comprises a Real Time Streaming Protocol (RTSP) stack adapted to request an establishment of a first RTSP session with an IPTV media server responsive to an IPTV service request from an Internet Protocol Television Terminal (ITF). The RTSP stack stores an identifier of the first RTSP session responsive to the request for the establishment of the RTSP session. Subsequently, the RTSP stack receives an RTSP session initiation message from the ITF requesting an establishment of an RTSP session. Upon receipt of the message, the content manager server authenticates the message, determines the existence of an existing RTSP session for the ITF, and thus acts to discard the session initiation message received from the ITF and to return the identifier of the first, already established, RTSP session.

13 Claims, 5 Drawing Sheets

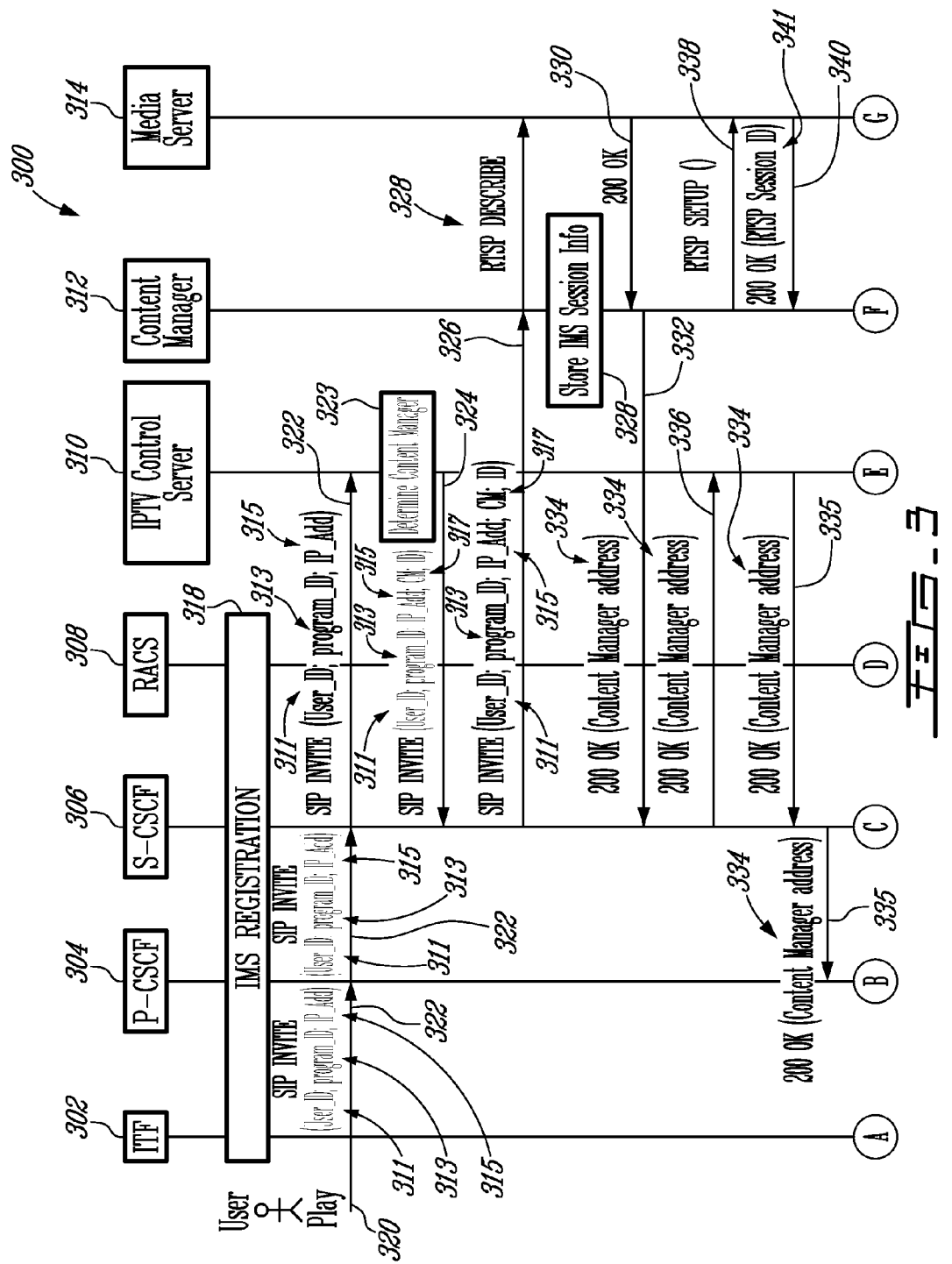

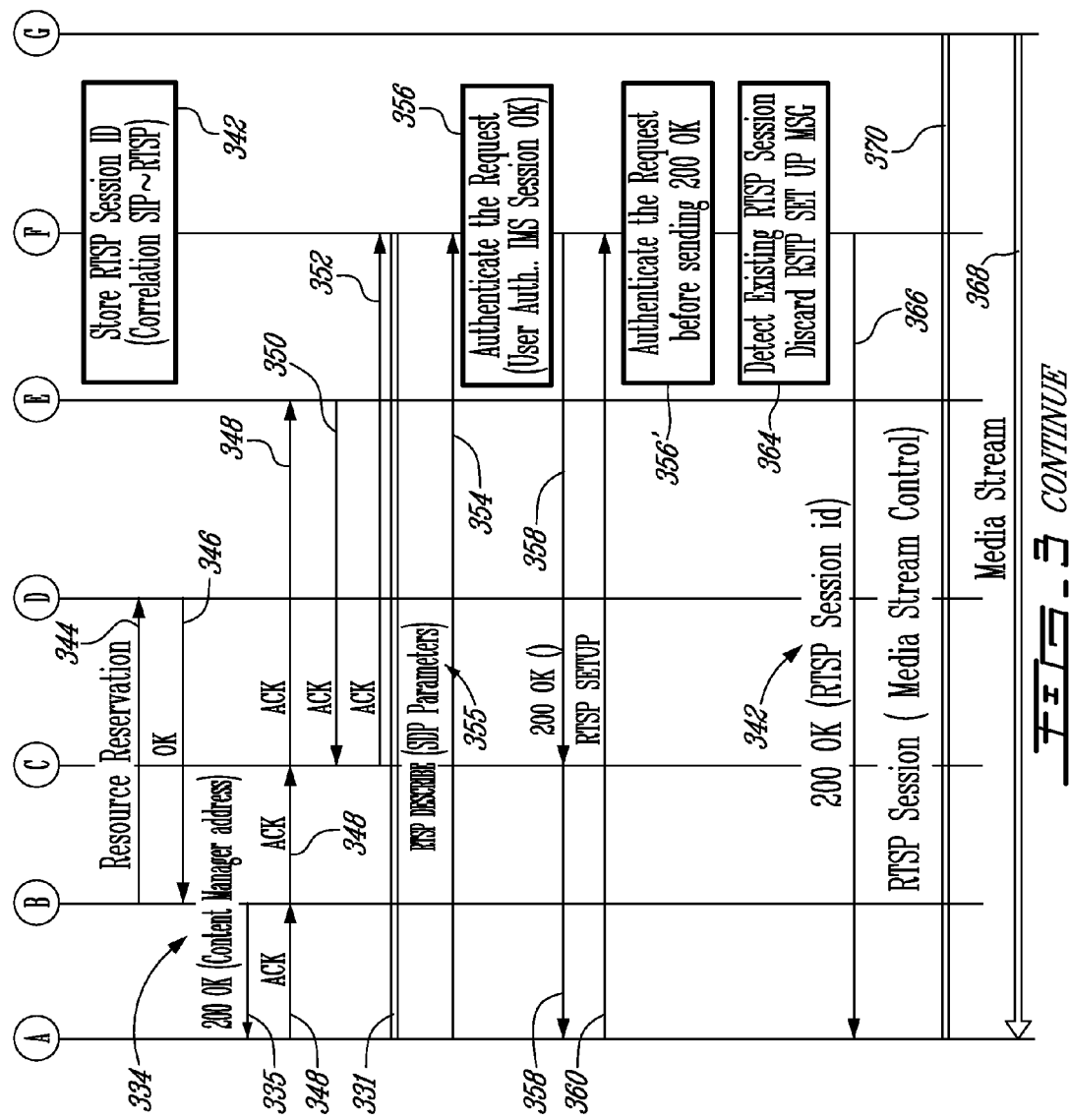

METHOD AND INTERNET PROTOCOL TELEVISION (IPTV) CONTENT MANAGER SERVER FOR IPTV SERVICING

TECHNICAL FIELD

The present invention relates to the area of Internet Protocol Television (IPTV).

BACKGROUND

As the level of technology increases, the options for communications have become more varied. For example, in the last 30 years in the telecommunications industry, personal communications have evolved from a home having a single rotary dial telephone, to a home having multiple telephones, cable and/or fiber optic lines that accommodate both voice and data. Additionally cellular phones and Wi-Fi have added a mobile element to communications. Similarly, in the entertainment industry, 30 years ago there was only one format for television and this format was transmitted over the air and received via antennas located at homes. This has evolved into both different standards of picture quality such as, standard definition TV (SDTV), enhanced definition TV (EDTV) and high definition TV (HDTV), and more systems for delivery of these different television display formats, such as cable and satellite. Additionally, services have grown to become overlapping between these two industries. As these systems continue to evolve in both industries, the service offerings will continue to merge and new services can be expected to be available for a consumer. Also these services will be based on the technical capability to process and output more information, for example as seen in the improvements in the picture quality of programs viewed on televisions, and therefore it is expected that service delivery requirements will continue to rely on more bandwidth being available throughout the network including the "last mile" to the end user.

Another related technology that impacts both the communications and entertainment industries is the Internet. The physical structure of the Internet and associated communication streams have also evolved to handle an increased flow of data. Servers have more memory than ever before, communications links exist that have a higher bandwidth than in the past, processors are faster and more capable and protocols exist to take advantage of these elements. As consumers' usage of the Internet grows, service companies have turned to the Internet (and other Internet Protocol (IP) networks) as a mechanism for providing traditional services. These multimedia services include Internet Protocol television (IPTV, referring to systems or services that deliver television programs over a network using IP data packets), Internet radio, video on demand (VOD), Voice over IP (VoIP), and other web related services received singly or bundled together.

IPTV is thus the delivery of programming of TV video streams encoded as a series of IP packets. IPTV can deliver either live TV or stored video (Video-on-Demand). IPTV service may also be bundled with other IP services, including VoIP and high-speed Internet access. In traditional television delivery, all programming (the TV programs) is broadcast simultaneously, over the air or over cable. The available program signals flow downstream and the viewer selects which program he wants to watch by changing the channel. IPTV, by contrast, typically sends only one program at a time. Content remains on the service provider's network and only the program the customer selects is sent to the home. When a viewer changes the channel, a new media stream is transmitted from the provider's server directly to the viewer. Like cable TV, IPTV requires a Set-Top Box (STB). IPTV primarily uses multicasting (a method in which information can be sent to multiple computers/terminals when these computers/terminals join an IP multicast address to which the selected content is being sent) with Internet Group Management Protocol (IGMP) used for live television broadcasts control and Real Time Streaming Protocol (RTSP) control for on-demand programs. Compatible video compression standards include H.264, Windows Media Video 9 and VC1 (Video Codec 1), DivX (a digital video codec created by DivX Networks, Inc.), and XviD (a video codec library following the MPEG-4 standard), and the MPEG-2 (Moving Pictures Expert Group) and MPEG-4. Also, in IPTV, Quality of Service (QoS) of the IPTV contents is guaranteed. As such, new content should be delivered to a requesting viewer (or admitted in the transit and access networks) only if it does not affect content being currently delivered to other users through the above networks.

Reference is now made to FIG. 1 (Prior Art), which shows a simplified network diagram of an exemplary IPTV system 8 for delivering IPTV channels to an end user's terminal. In FIG. 1, a TV 10 is connected to an STB 12. In certain implementation, the combination of an STB 12 functionality combined with a display 10 is referred to as an IPTV Terminal Function (ITF) 13, which is the user's terminal. The ITF 13 is in communication with an access node 14 which in turn is connected with an IP Network 16. The access node 14 may be any type of node which could be used to connect STB 12 to an IP network 16 such as for example a Digital Subscriber Line Access Multiplexer (DSLAM). The IP Network 16 is in communication with one or more IPTV media server(s) 18, which contain(s) the IPTV media content that an end user desires to view upon TV 10. Furthermore, an IPTV content manager 17 functions to find, on behalf of the user, the most appropriate media server 18 (among multiple media servers, not shown) from where the selected media content can be delivered. The media server 18 delivers the IPTV channels containing streaming video in the desired format, e.g., MPEG 2 or MPEG-4, to an end user, where the content is displayed upon TV 10. Media stream control is performed via RTSP sessions 21 established between the media server 18 and the IPTV content manager 17 on one side, and between the IPTV control manager 17 and the ITF 13 on the other side, while the actual media stream is delivered via the media path 23 directly from the media server 18 to the ITF 13. It will be understood that there could be more intervening nodes between the ITF 13 and the media server 18 than those shown in the simplified system of FIG. 1.

In the exemplary IPTV system 8, the content delivery network is typically distributed, i.e. there are multiple media servers 18 (only one is shown for simplicity purposes). This is desirable so that the most closely located media server 18 can be selected to serve a user that desires to access a specific content. As such, a request for watching media content is typically sent from the ITF 13 to the content manager 17, where the later takes on the responsibility of locating the appropriate media server 18 to service the user. Following that, the ITF 13 can start communicating with the content manager 17, to start the streaming of the desired media content. Hence, all RTSP control traffic coming from the ITF 13 is proxied through the content manager 17 to the selected media server 18, while the actual media content is delivered directly from the media server 18 to the ITF 13.

Reference is now made to FIG. 2 (Prior Art) that shows a typical IPTV implementation in an IMS-based (IP Multimedia Subsystem) network 200. In the IMS-based IPTV system, the architecture described previously in relation to FIG. 1 is still valid, and as such there is a need to cope with it, which poses additional challenges. Within the IMS based architecture, an IMS session (also called herein a Session Initiation Protocol (SIP) session) is typically used to set up a unicast session for admission control purposes between an ITF 213, the IMS core network 214, the IPTV control server, 270 and the content manager 270. For this purpose, all these nodes typically support SIP-based communications. The IMS core network 214 typically comprises multiple CSCFs (Call State Control Functions) and other nodes according to the current IMS specifications. The function of the IPTV control server 270 is to coordinate IPTV sessions that need to be established for the provision of IPTV services, perform service access, and generate charging data. The content manager 270 acts, as also briefly described hereinbefore, to control the media servers and acts as a proxy between the ITF and the media server. Finally, FIG. 2 shows an IPTV Media Server 280 (only one is shown for simplicity purposes), which functions to store media content to be streamed to ITFs. In FIG. 2, in order to provide IPTV service to the ITF 213, first, a SIP session 222 is established between the ITF 213, via the IMS core 214 and the IPTV control server 270 and up to the content manager 270. RTSP media stream control can thus be performed between the ITF 213 and the content manager 270 and further with the media server 280 that streams the desired IPTV content toward the ITF 213. Delivery of the media content of interest is performed via a media delivery path 230 established directly between the media server 280 and the ITF 213.

One of the currently proposed approaches within the course of setting up an IMS session for IPTV servicing, is for the content manager 270 to set up the RTSP control session 210, and in such a case the SIP 200 OK sent in response to the SIP INVITE message that initiated the IMS session needs to transport not only the content manager 270 address but also the identifier of the new RTSP session. This allows the content manager to maintain the correlation between the SIP session being used and the RTPS session, which is required for session management purposes and for correlating the charging information generated from the different nodes. Following that, the RTSP session established between the content manager 270 and the ITF 213, the later can start the stream control since it has the RTSP identifier. This option has the advantage that the content manager 270 can maintain an association between the existing SIP session and RTSP session, which ensures that no illegal ITFs can start up illegal RTSP sessions, since ITFs are only allowed to do media stream control (Play, Fast Forward, Stop, etc). On the other hand, this option has the disadvantage that it cannot be used with many existing RTSP stacks where the session setup is an integral part of the stack, i.e. where the ITFs cannot do stream control unless they themselves initiated the creation of the RTSP session. Hence, for many legacy RTSP stacks that are present in ITFs, this option does not work.

As such, there is a need to find another approach that can retain the advantages offered by the IMS-based IPTV architecture, while still allowing legacy RTSP stacks to be used.

Although it does not disclose the teachings of the present invention, the co-pending, co-invented and co-owned U.S. patent application Ser. No. 11/615,506, entitled "A Method of Correlating a Media Session to a Signalling Session" bears some relation with the field of the invention. In this patent application, there is disclosed a user terminal that uses SIP to establish an RTSP media session with a media content server. An application server, which establishes the RTSP media session, links the RTSP media session to the corresponding SIP session. Once the RTSP session is set up and linked to the SIP session, the media content server streams the media content to the user terminal. While this application relates to the field of IPTV, its teaching is limited to a SIP-RTSP sessions correlation performed at the application server level, and thus stops short of disclosing the present invention.

Accordingly, it should be readily appreciated that in order to overcome the deficiencies and shortcomings of the existing solutions, it would be advantageous to have a solution that can retain the advantages offered by the IMS-based IPTV architecture, while still allowing legacy RTSP stacks to be used. The present invention provides such a method and system.

SUMMARY

In one aspect, the present invention is a method for Internet Protocol Television (IPTV) service provisioning, the method starting by requesting an establishment of a first Real Time Streaming Protocol (RTSP) session between an IPTV content manager and an IPTV media server in response to an IPTV service request from an Internet Protocol Television Terminal (ITF). The method further allows for the storing of an identifier of the first RTSP session and for the receipt of an RTSP session initiation message from the ITF requesting an establishment of a second RTSP session. The method continues with the discarding of the session initiation message received from the ITF and allows for the returning to the ITF of the identifier of the first RTSP session.

In another aspect, the present invention is an IPTV content manager server comprising an RTSP stack module that requests the establishment of an RTSP session between the IPTV content manager and an IPTV media server in response to an IPTV service request from an ITF. The server comprises a first data repository storing an identifier of the first RTSP session responsive to the request for the establishment of the first RTSP session. The RTSP stack module also receives an RTSP session initiation message from the ITF requesting an establishment of a second RTSP session. The RTSP stack module discards the session initiation message received from the ITF and rather returns to the ITF the identifier of the first RTSP session.

DRAWINGS

For a more detailed understanding of the invention, for further objects and advantages thereof, reference can now be made to the following description, taken in conjunction with the accompanying drawings, in which:

FIG. 3 is an exemplary nodal operation and signal flow diagram showing one of the preferred embodiments of the present invention.

DETAILED DESCRIPTION

Figure 1:
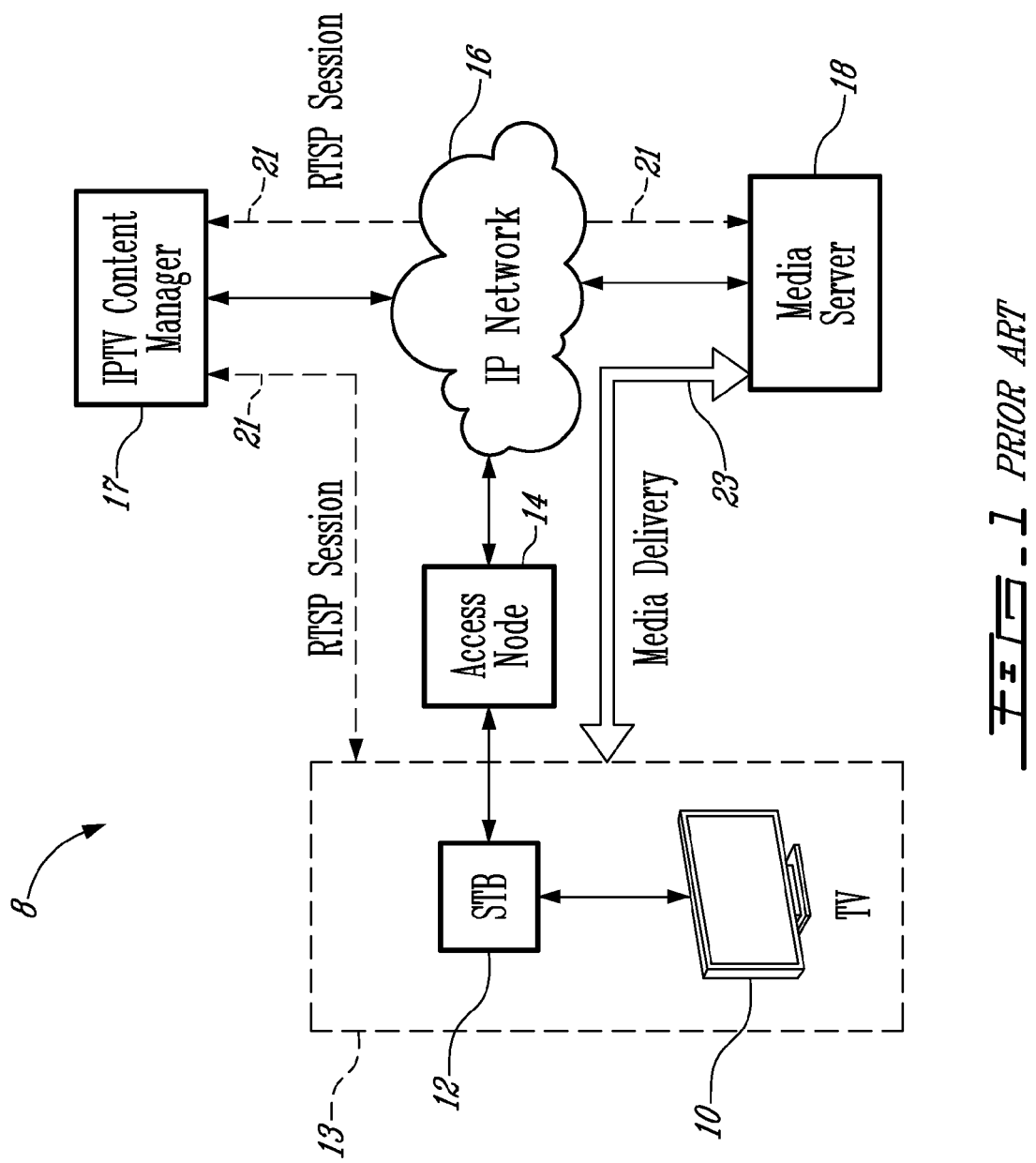
FIG. 1 (Prior Art) is a simplified network diagram of an exemplary IPTV system for delivering IPTV channels to an end user.
Figure 2:
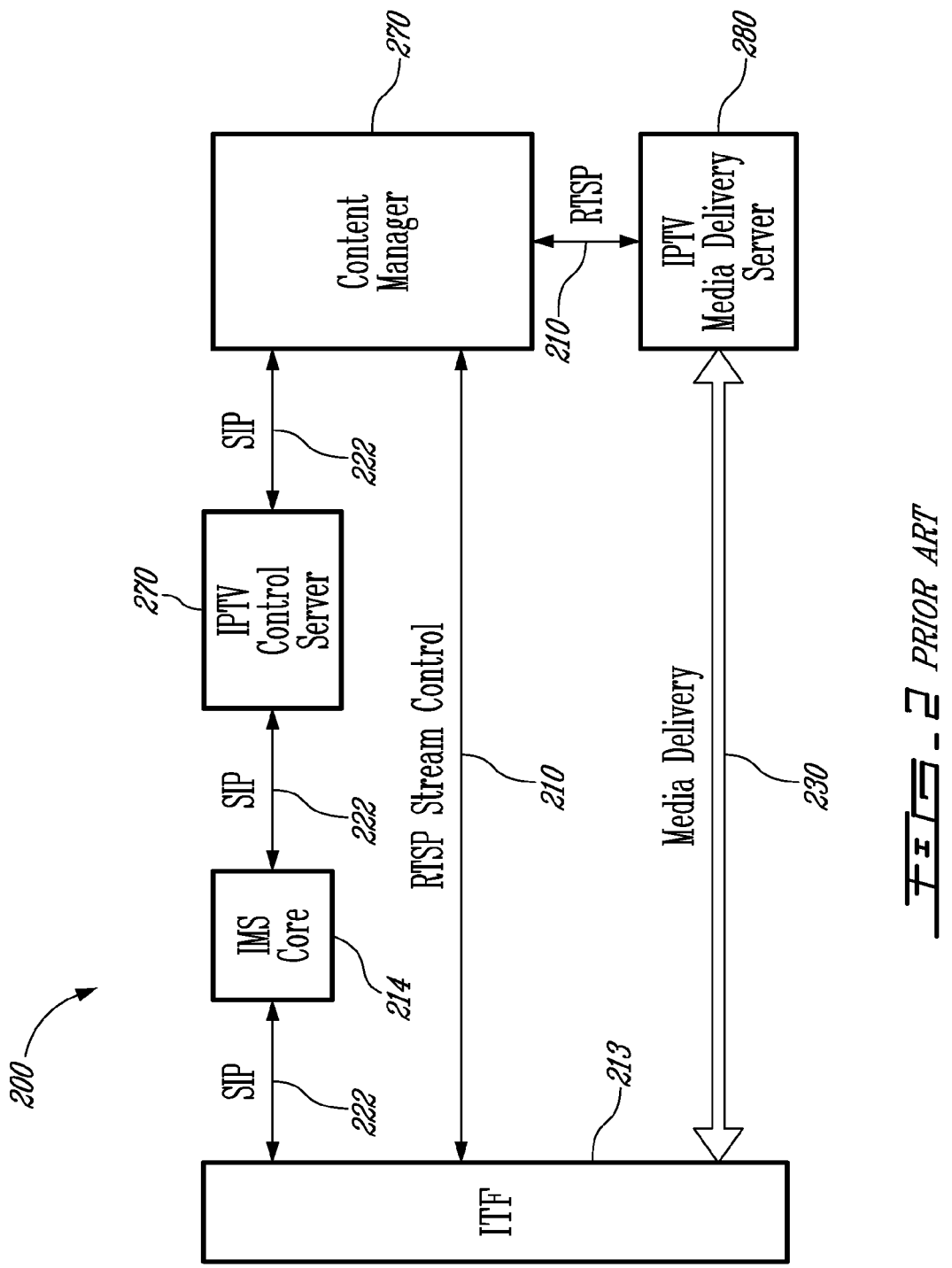
FIG. 2 (Prior Art) is a typical IPTV implementation in an IMS-based telecommunications network.

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

The present invention provides a method for a content manager server that allows existing IPTV terminals making use of legacy RTSP stacks to continue to be used for IPTV servicing. Legacy RTSP stacks are configured in such a way that the RTSP session used for controlling the media stream has to be initiated by the RTSP stacks themselves, i.e. the ITF that stores the legacy RTSP stack must initiate the RTSP session used for media stream control. Otherwise, if it is rather another network node (such as an IPTV content manager server) that initiates the RTSP session toward the ITF that uses a legacy RTSP stack, the ITF cannot perform proper media stream control over the RTSP session. For this reason, there is a need for a solution that allows the use of legacy RTSP stacks while still allowing for the content manager server to perform optimised functions.

According to present invention, when an IMS session is established for an ITF to be provided IPTV service, the content manager server first stores IMS session information, including information about the identity of the session originator (e.g. the originator's identity, originator's IP address), during the IMS session setup procedure. Such information may be extracted, for example, from the FROM field of the IMS session origination message and/or from a VIA entry in the VIA header of the incoming data packets of that message. The IMS session information may further include SDP information obtained from the origination message, which includes the address where the ITF would like to receive the media along with session information required to stream the media. This includes the IP address for the destination for the media, the video codes, the required bandwidth, etc. Once the IMS session information stored, an IMS session is established between the ITF and the content manager server for use in the provision of the IPTV service. According to the invention, the content manager server further establishes with the selected IPTV media server, on behalf of the ITF, an RTSP session, and further stores the RTSP session identifier, but may not immediately return it to the ITF during the IMS session setup sequence. Rather, the content manager server waits for the ITF to request the establishment of an RTSP session. As the ITF uses its legacy RTSP stack to initiate an RTSP session, it can then use that legacy RTSP stack to control the IPTV media stream to come. When the content manager server receives a request for the RTSP session from the ITF, it intercepts the request message and uses it to authenticate the user using the previously stored IMS session information.

Authentication can be done as follows: the content manager server may use the source address of the incoming IP packets of the request to locate a record for that user. If a record is located, then it proceeds with the next step. Otherwise it rejects the request. It then compares the SDP information included in the SDP parameters of the request with the already stored SDP information. If there is a match, the message is said to be authenticated. Otherwise the request is denied.

When the ITF is successfully authenticated by the content manager server, the later discards the request message received from the ITF (i.e. does not further establish an RTSP session based on the ITF's request). The message is discarded because there is no need to pursue the RTSP setup sequence to establish a second RTSP session, since a first one is already established by the content manager on behalf of the ITF. Thus, the content manager server rather returns to the ITF the RTSP session identifier already stored, which identifies the first RTSP session previously established by the content manager server on behalf of the ITF. From this point on, the ITF uses the RTSP session previously established by the content manager in order to control the media stream received from the media server, which allows for normal stream control operations to be performed.

Reference is now made to FIG. 3, which is an exemplary nodal operation and signal flow diagram showing one of the preferred embodiments of the present invention. Shown in FIG. 3 is an IMS-based IPTV network 300 allowing the provision of IPTV content to an ITF 302. The network 300 further comprises a Proxy Call State Control Function (P-CSCF) 304 and a Serving CSCF (S-CSCF) 306 whose function is to provide support for IMS-based connections between the network and the ITF 302. A Resource and Admission Control Sub-System (RACS) 308 manages the allocation of the network's resources for the connection with the ITF 302 and performs admission control, bandwidth management, quality of service assignments, etc. The function of the IPTV control server 310 is to coordinate IPTV sessions that need to be established for IPTV services, perform service access, and generate charging data. Finally, the network 300 comprises one or more IPTV content managers 312 (only one is shown for simplicity purposes) that functions to select the appropriate media server 314 on behalf of the ITF 302 depending upon the requested content program. It is to be noted that for simplicity purposes, FIG. 3 only illustrates one ITF 302 and one media server 314, even if in actual implementations a network 300 would typically comprise multiple ITFs as well as multiple media servers 314.

The exemplary scenario described in FIG. 3 starts with the ITF 302 registering with the network 300 via a regular IMS registration procedure 318, which is required for the ITF 302 to be provided any type of IMS service by the network 300. Once the ITF 302 is properly registered, at a given point in time, the user of the ITF 302 desires to watch IPTV content, such as for example a Video-On-Demand movie. For this purpose, the user may select a Uniform Resource Locator (URL) of the desired movie (e.g. via a web interface of the ITF 302) and issues a play command in order to begin the media streaming of the movie, action 320. In action 322, the ITF 302 issues an IPTV service request, which may take the form of a SIP INVITE message for requesting the establishment of an IMS session (alternatively called a SIP session) with the content manager server 312 that stores the requested movie content. The SIP INVITE message 322 may comprise an identity of the user/ITF 311, the movie content identifier 313, the IP address 315 of the ITF 302, as well as other session parameters describing the desired session, and included in Session Description Protocol (SDP) parameters carried in the SIP INVITE. The message 322 is received, via the S-CSCF 304 and the S-CSCF 306 by the IPTV control server 310, which determines the identity 317 of the proper media server that can provide the movie content, action 323. The IPTV control server 310, which acts as a Back to Back SIP User Agent (B2BUA) further issues another SIP INVITE message 324 (which further contains the identity 317 of the selected media server 312) back to the S-CSCF 306 in order to request the further propagation of the IMS session with the S-CSCF 306 and up to the determined content manager server 312. The S-CSCF 306 routes the SIP INVITE message 326 to the determined content manager server 312 for extending the IMS session up thereto, the message 326 comprising information about the IMS session including the user identity 311, the requested program's identifier 313, the ITF's 302 IP address 315, the media server identifier 317 (as well as other SDP session parameters describing the desired session). In action 329, the content manager server 312 stores the IMS session information received in the message 326, including the SDP information. For example, the content manager server 312 may store the IMS session information including information about the identity of the session originator (e.g. the originator's identity/the originator's IP address). Such information may be extracted, for example, from the FROM field of the SIP INVITE message 326 and/or from the first VIA entry in the VIA header of the message.

Then, the content manager server 312 responds back to the S-CSCF 306 with a 200 OK message containing its own address 334, which confirms the acceptance of the content manager server 312 to participate to the IMS session. Another 200 OK message 336 is sent from the S-CSCF 306 to the IPTV control server 310 further confirming the acceptance of the S-CSCF to also participate in the IMS session. Finally, 200 OK messages 335 confirm the participation of the IPTV control server 310 and of the S-CSCF to the same session toward the P-CSCF 304.

In action 344, the P-CSCF 304 initiates the procedure for resources reservation for the IMS session with the RACS 308 and, when resources are properly allocated by the RACS based on the requirements for the IMS session, a confirmation 346 is returned from the RACS to the P-CSCF 304, which triggers the propagation of the 200 OK message 335 further to the ITF 302, to confirm the establishment of the IMS session 331. Acknowledgement messages 348-350 are then exchanged to confirm the establishment of the IMS session 331 between the ITF 302 and the content manager server 312.

Substantially at the same time, such as for example subsequent to receipt of the SIP INVITE message 326, the content manager server 312 initiates the establishment of an RTSP session with the determined IPTV media server 314, on behalf of the ITF 302. The purpose of the RTSP session is to allow stream control to be performed by the ITF on the media stream associated with the desired IPTV content. For this purpose, the content manager server 312 issues an RTSP DESCRIBE message, in action 328, which typically carries information about the required media codecs to be used for the media streaming, the IP address of the participant ITF 302, the bandwidth required, etc. The media server 314 responds back with a 200 OK message 330 confirming this information and including its own address. The content manager server 312 further transmits an RTSP SETUP message 338 to the media server 314 to request the actual setup of the RTSP session, whose acceptance from the media server 314 is confirmed in the subsequent 200 OK message 340, the later including an identifier 341 of the RTSP session that is being established between the content manager server 312 and the media server 314. Further in action 342, the content manager server 312 stores the RTSP session identifier 341 and also correlates the RTSP session established with the media server 314 and identified by identifier 341 with the IMS session being currently established with the ITF 302. Thus, a correlation IMS session~RTSP session is created and stored, with all pertinent information from both sessions, in the content manager for the ITF 302.

Once the IMS session 331 is established between the ITF 302 and the content manager server 312, the ITF 302 detects that there is a need for an RTSP session for stream control. This is because the ITF 302 in unaware about the RTSP session already established by the content manager server 312 on its behalf. Thus, the ITF 302 initiates a request for establishing a new RTSP session by sending out an RTSP DESCRIBE message 354 to the content manager 312, the message optionally including SDP parameters 355 for the session such as the ITF's 302 IP address for rendering the media as well as other session parameters describing the desired the session. The SDP parameters 355 included in the RTSP DESCRIBE message 354 would typically be identical to the SDP parameters included in the messages 322 and 326 requesting the IMS session 331 that the ITF 302 initiated. The content manager server 312 receives the message 354, and in action 356 authenticates the message. This message authentication may be performed in various forms. For example, authentication can be done by the content manager server 312 using the source address of the incoming IP packets of the message 354 to locate a record for that user. If a record is located, then the content manager server 312 proceeds with the next step. Otherwise it rejects the request (action not shown in FIG. 3). The content manager server 312 then compares the SDP information included in the SDP parameters 355 of the message 354 with the IMS information extracted previously in action 329 from the SIP INVITE message 326. If there is a match, the message is said to be authenticated.

The content manager server 312 then concludes that the ITF 302 is legitimate, because authenticated, and deserves to be provided with an RTSP session for media control. Thus, returns back to the ITF 302 a 200 OK message 358 that includes the media server information related to the RTSP session it already established on behalf of the ITF 302. The ITF 302 then issues an RTSP session initiation message, which may take the form of an RTSP SETUP message 360 that requests the actual creation of an RTSP session with the content manager 312. An authentication 356' may optionally be further performed on the message 360 in a manner analogous to the previously described authentication action 356, or be skipped if the previous authentication 356 is judged sufficient, depending upon the implementation. In action 364, the content manager server 312 determines that a first RTSP session has been already established on behalf of the ITF 302, and that consequently, there is no need for establishing a second RTSP session based on the request 360. In action 364, the content manager server 312 may act to discard the RTSP SETUP message 360, although, alternatively, the discard action may be performed earlier, such as for example as part of the authentication action 356 or 356'. Then, the content manager server 312 further acts to respond back to the ITF 302 with a 200 OK message 366 that contains the RTSP session identifier 342 of the first RTSP session established on behalf of the ITF 302. That message tells the ITF 302 to use the first RTSP session, identified by the identifier 342, for controlling the media stream of the requested IPTV service. Finally, in action 368 the ITF 302 starts receiving the media stream from the media server 314, and uses the RTSP session 370, that now extends from the media server 314 up to the ITF 392, to perform media stream control. As mentioned previously, RTSP session control messages are proxied through the content manager server 312, while the media itself is streamed directly between the media server 314, and the ITF 302.

Figure 4:
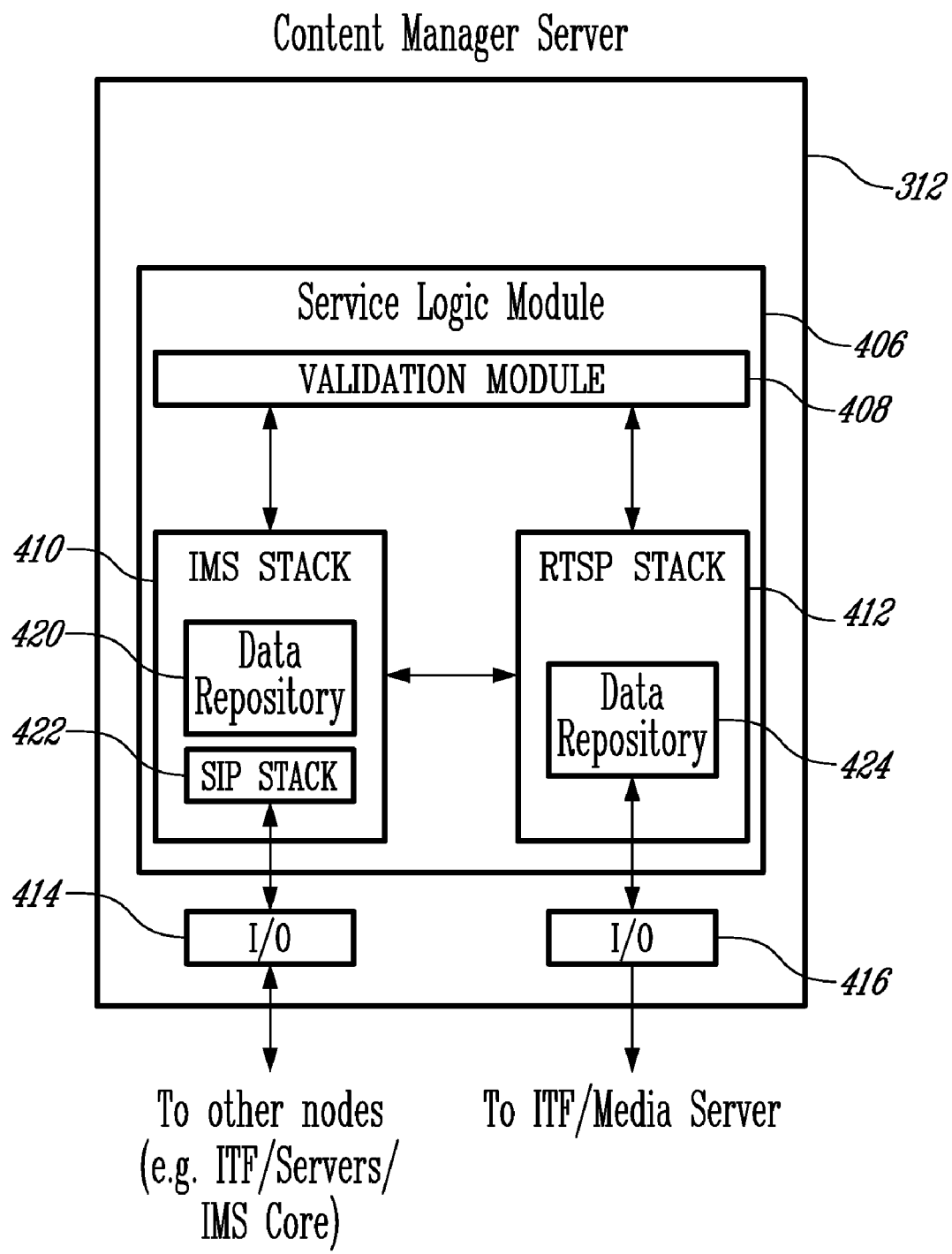
FIG. 4 is a high-level node diagram of an exemplary implementation of the invention in a content manager server according one of the preferred embodiments of the present invention.

Reference is now made to FIG. 4, which is a high-level node diagram of an exemplary implementation of the invention in the content manager server 312. Shown in FIG. 4 is the content manager server 312 that comprises a service logic module 406 that acts to perform actions, commands, and calculations in order to provide support for IPTV services requested by end-users, via their ITFs. The service logic module 406 may contain various modules, including an IMS stack module 410 and an RTSP stack module 412. The IMS stack module 410 comprises a SIP stack 422 that enables support of SIP/IMS sessions and communications using SIP for providing signalling and control for the provision of IPTV services. The RTSP stack module 412 provides RTSP signalling support for media stream control functions according to the RTSP protocol and also contains a data repository used to store RTSP session identifiers, as well as other RTSP session information, including but not limited to SDP parameters, session parties identities and addresses, etc, as previously described. Likewise, the IMS stack 410 includes a data repository for storing IMS session information as described hereinbefore, including but being not limited to session user identities and addresses, program content identifiers, SDP parameters associated with the IMS sessions, etc. Finally, the service logic module 408 includes a validation module that acts to get the IMS session information from the IMS stack on one side, and the RTSP session identifier on the other side, and perform authentication as described hereinbefore.

In particular, with reference being now made jointly to FIG. 3 and FIG. 4, the content manager server 312 receives the SIP INVITE message 326 at its IMS stack 410 and obtains and stores on the repository 420 the IMS session information, including, for example, the ITF's IP address 315, the ITF's user identity 311, the program content identifier 313, the selected media server's identifier 317 and other SDP information that may be included in the SIP INVITE message 326. The service logic module 406 then determines the selected media server 314, and the RTSP stack 412 is instructed to initiate the RTSP session with the former. Communication takes place with the media server 314 to set up the RTSP session in actions 328, 330, 338, and 340 and the content manager server 312 stores in the data repository 424, in action 342, the RTSP session identifier 341. Meanwhile, the IMS stack participates via action 332 to the completion of the IMS session 331. Later on, when the RTSP DESCRIBE message 354 is received at the content manager server 313, the RTSP stack module 412 receives the message 354, and the validation module 408 authenticates/validates the message using the IMS session information stored (including the SDP information) from the repository 420 along with SDP information from the message 354 itself. This authentication may be performed in various forms. For example, the RTSP stack 412 may provide the message 354 including information from the SDP parameters 355 to the validation module 408, which determines the source address of the incoming IP packets of the message 354 to locate that user. If the user is located, then validation proceeds with the next step. Otherwise, the validation module 408 rejects the request, and the RTSP stack module 412 is instructed to return an error message to the ITF (action not shown). The validation module 408 may then obtain from the IMS stack module 410 the IMS session information acquired during the IMS session setup, and compare the IMS session information with the SDP information 355 received in message 354. If there is a match, the message is said to be authenticated/validated. In such an instance, a positive authentication/validation instruction is returned from the validation module 408 to the RTSP stack 412, which then discards the message 354, and responds back to the ITF 302 with the 200 OK message 358. A similar authentication 356' may be further performed, optionally, following receipt by the RTSP stack 412 of the next RTSP SETUP message 360. Thereafter, the RTSP stack module 412 detects in action 364 that an existing RTSP session is already set up for the ITF 302. This may be achieved by comparing the information from the message 360 (ITF's IP address, user identity, and/or SDP parameters) with the information stored in action 342 and relative to the IMS session and the RTSP session already established. When this is done, upon positive match, the RTSP stack module 412 concludes that there already exists an RTSP session for the ITF 302, and that there is no need for a further RTSP session to be established based on the request 360. Therefore, the RTSP stack module 412 discards the message 360, and rather returns to the ITF 302 the 200 OK message 366 containing the original RTSP session identifier 342 designating the first RTSP session. Upon receipt of that RTSP session identifier, the ITF 302 is instructed to use that RTSP session to control the media stream. Finally, the RTSP session 370 is established between the ITF 302 and the content manager server 312, and stream control can be performed for the media stream 368 that brings the IPTV programming content from the media server 314 to the ITF 302.

Based upon the foregoing, it should now be apparent to those of ordinary skills in the art that the present invention provides an advantageous solution, which offers a simple yet flexible and efficient manner of establishing RTSP session for IPTV media stream control, which allows legacy RTSP stacks of ITFs to be used for IPTV servicing. Although the system and method of the present invention have been described with particular reference to certain type of messages and nodes, it should be realized upon reference hereto that the innovative teachings contained herein are not necessarily limited thereto and may be implemented advantageously in various manners. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

The invention claimed is:

1. A method for Internet Protocol Television (IPTV) service provisioning, the method comprising the steps of:
   a. requesting an establishment of a Real Time Streaming Protocol (RTSP) session between an IPTV content manager and an IPTV media server in response to an IPTV service request from an Internet Protocol Television Terminal (ITF);
   b. storing an identifier of the RTSP session;
   c. receiving an RTSP session initiation message from the ITF; and
   e. returning to the ITF the identifier of the already established RTSP session.

2. The method claimed in claim 1, further comprising the step of:
   f. responsive to the request, establishing an IMS (IP Multimedia Subsystem) session involving the ITF.

3. The method claimed in claim 2, further comprising the steps of:
   g. when establishing the IMS session, storing IMS session information including an identity and an IP address of the ITF;
   h. validating the RTSP session initiation message received from the ITF using information obtained from the message and the IMS session information; and
   i. when the RTSP session initiation message is validated, performing step f.

4. The method claimed in claim 2, further comprising the steps of:
   receiving a Session Initiation protocol (SIP) INVITE message from the ITF, wherein the IPTV service request received from an Internet Protocol Television Terminal comprises the SIP INVITE message; and
   wherein step f. comprises establishing a SIP session between the ITF and the IPTV media server.

5. The method claimed in claim 1, further comprising the step of:
   f. receiving IPTV media streaming control commands using RTSP over the RTSP session.

6. The method claimed in claim 1, wherein steps a. through e. are performed by an IPTV content manager server.

7. The method claimed in claim 1, wherein step c. comprises receiving an RTSP SETUP message from the ITF.

8. An Internet Protocol Television (IPTV) content manager server comprising:
   a Real Time Streaming protocol (RTSP) stack module adapted to request an establishment of a RTSP session between the IPTV content manager and an IPTV media server in response to an IPTV service request received from an Internet Protocol Television Terminal (ITF);
   a first data repository storing an identifier of the RTSP session responsive to the request for the establishment of the RTSP session;
   the RTSP stack module being further adapted to receive an RTSP session initiation message from the ITF and to return to the ITF the identifier of the already established RTSP session.

9. The IPTV server claimed in claim 8, further comprising:
   an Internet Protocol Multimedia Subsystem (IMS) stack module adapted to support an IMS session involving an ITF in response to a receipt of the service request from the ITF.

10. The IPTV server claimed in claim 9, further comprising:
    a second data repository that stores IMS session information including an identity and an IP address of the ITF when the IMS session is established by the IMS stack module; and
    a validation module that validates the RTSP session initiation message received from the ITF using information obtained from the message and the IMS session information, the validation module instructing the RTSP stack module to discard the session initiation message received from the ITF and to return to the ITF the identifier of the RTSP session when the RTSP session initiation message is validated.

11. The IPTV server claimed in claim 9 wherein the IMS stack module receives a Session Initiation protocol (SIP) INVITE message from the ITF and initiates the IMS session, and the IMS session comprises a SIP session established between the ITF and the IPTV media server.

12. The IPTV server claimed in claim 8, wherein the RTSP stack module is further adapted to receive IPTV media streaming control commands over the RTSP session.

13. The IPTV server claimed in claim 8, wherein the RTSP stack module receives an RTSP SETUP message from the ITF.

* * * * *